Dec. 26, 1922.                                           1,439,782
A. C. WOOD.
LIGHT RAY INTERCEPTER.
FILED DEC. 15, 1920.

Inventor
Arthur Charles Wood
By
Attorney

Patented Dec. 26, 1922.

1,439,782

UNITED STATES PATENT OFFICE.

ARTHUR CHARLES WOOD, OF MANSFIELD, OHIO, ASSIGNOR, BY MESNE ASSIGNMENTS, TO THE MANSFIELD LAMP AND MANUFACTURING COMPANY.

LIGHT-RAY INTERCEPTOR.

Application filed December 15, 1920. Serial No. 430,940.

*To all whom it may concern:*

Be it known that I, ARTHUR CHARLES WOOD, a citizen of the United States of America, residing at Mansfield, in the county of Richland and State of Ohio, have invented certain new and useful Improvements in Light-Ray Interceptors, of which the following is a specification.

This invention relates to improvements in a light ray interceptor for lamps.

It is well known to drivers of motor cars or the like that unless the driver of an oncoming car dims or changes the direction of the projection of the rays of light emitted from the lamps of his car so as to prevent the rays of light or glare thereof from being directed into the eyes of the driver of an approaching car, that the vision of the driver of the approaching car will be blinded making it difficult if not impossible for the driver to locate the position on the road of the oncoming car so as to control the course of travel of his car, to prevent a collision of the cars and probable injury to the cars and occupants.

The primary object of the present invention is to provide means of shading a predetermined portion of a light source so as to intercept or interrupt the reflected or projected rays of light emitted from a portion of a reflector that is associated therewith, without affecting the illumination, interfering with the reflected rays of light, or changing the direction of their projection from the portion of the reflector that is not shaded.

A further object is to construct a mechanism for manually operating a shade which is associated with a light source and a reflector of a lamp for intercepting or shading the rays of light and to prevent the reflection of the rays of light from a pre-determined portion of the reflector, and means for automatically returning the shade to its normal position.

The preferable construction, combination and arrangement of the parts of the mechanism to carry out the principle of the invention are shown in the drawings and consists of associating a shade, a light source and a reflector in such a manner as to provide means operable at the will of the driver, for shading a pre-determined portion of the light source when approaching an oncoming car (preferably the lower portion and sides thereof) to prevent the light source from causing rays of light to be reflected from the reflector in front of upwardly or at an angular relation with respect to the plane of the car, while at the same time the light rays of the upper portion of the light source are being directed against the upper portion of the reflector causing the reflected rays of light to shoot downward in full illumination on the road, in front of the car for the benefit of the driver of the car equipped with the invention and without detriment to or affecting the vision of the driver of an oncoming car.

These and other objects are attained by the mechanism illustrated in the accompanying drawing in which:—

Figure 1:
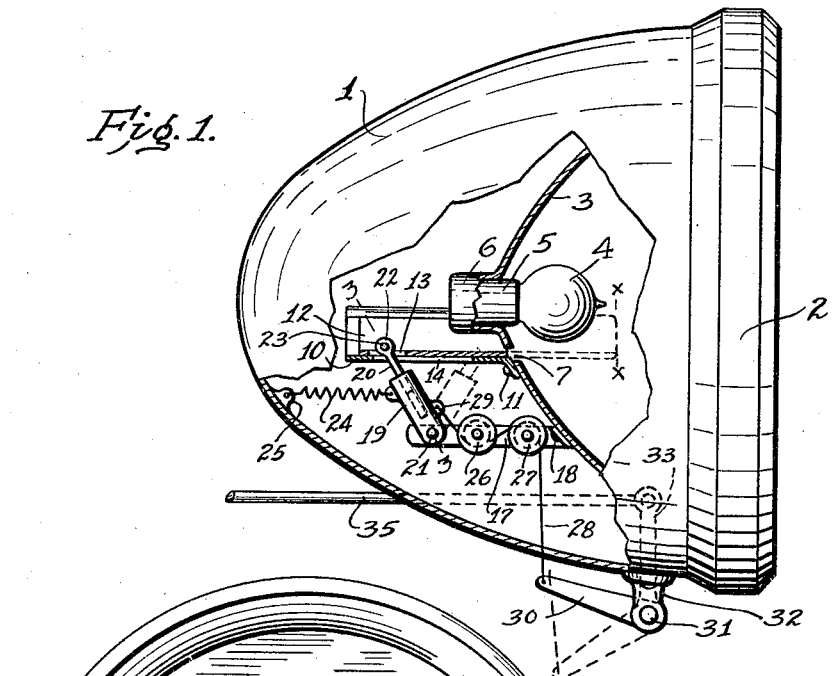
Fig. 1, is a side elevation of a conventional type of lamp with the casing partly broken away to show the applications of the invention thereto.

The invention is preferably applied to a parabolic type of lamp provided with similar form of reflector but it can, however, be applied to other forms of lamps and reflectors without deviating from the principle of the invention described and shown in the drawings.

In the drawings a parabolic type of lamp is shown consisting of the casing 1 having a ring member 2 beaded, or otherwise fastened to the enlarged open end portion of the casing in any conventional manner. A reflector 3 preferably of the parabolic type or form is fastened to the casing by any well known fastening means. A light source preferably an electric light globe 4 is held at the center of the reflector through the medium of the globe holder 5, which is telescopically fitted within the rearwardly extending neck portion 6 of the reflector. An electric current is transmitted to the globe from any source of supply in a conventional manner (not shown on the drawings).

Figure 2:
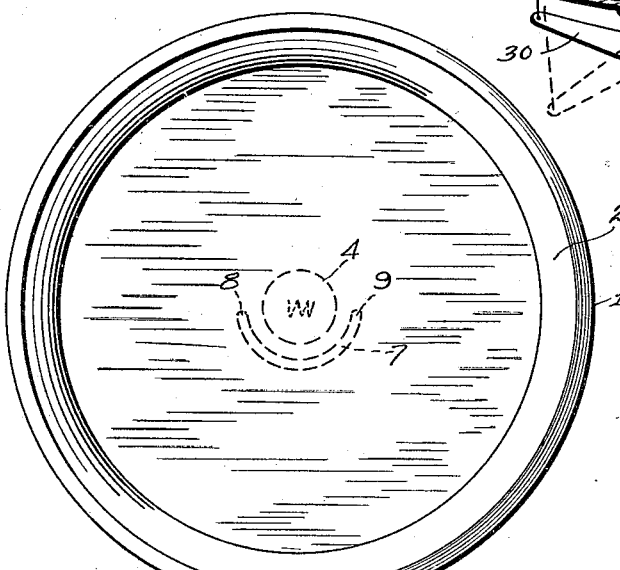
Fig. 2, is a front elevation of Fig. 1, showing a rotatable crank shaft with cranks mounted thereon for operating the shade.
Figure 3:
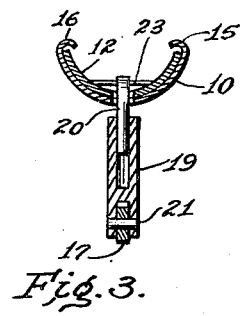
Fig. 3, is a sectional view on the line 3—3 of Fig. 1.

In the preferable application of the invention a semicircular slot 7 is formed in the reflector and preferably located beneath the globe 4 and in close proximity thereto as shown in Figure 2.

The sides 8 and 9 of the slot 7 formed in the reflector preferably extend upwardly on each side of the globe 4 to a point that is approximately in alignment with the longitudinal axis of the globe. A rearwardly extending sliding circular bracket 10 is fastened to the reflector by rivets 11 or the like and is so arranged and located thereon as to bring its inner surface in alignment with the lower wall of the slot 7.

A shade 12 is slidably mounted upon the supporting bracket 10 with its front end normally held in a position to enter or extend into the slot 7 formed in the reflector. The sliding shade is provided with a slot 13 which aligns with a similar, but elongated slot 14 provided in the rearwardly extending supporting bracket 10.

The ends of the supporting bracket 15 and 16 are turned inwardly to extend over and enclose the top of the sides of the sliding shade 12 for the purpose of guiding and maintaining the shade 12 in a sliding contact with inner surface of the bracket 10. An auxiliary bracket 17 is spaced apart from, located beneath the bracket 10 and is attached to the reflector by rivets 18 or the like.

An arm constructed of two parts 19 and 20 which are telescopically fitted together is provided, having the lower part 19 pivotally mounted upon the bracket 17 on a pin 21. The upper part 20 of the arm is provided with an eye 22 which extends through the slot 13 formed in the sliding shade 12 and a pin 23 is inserted in the eye 22 of the part 20 and is fastened to the upper surface of the sliding shade by spot welding, solder or the like, thereby, connecting the telescopic arm to the sliding shade 12 to impart movement to the sliding shade when the telescopic arm is pivoted for the purpose intended. An expansible spring 24 is connected to one end of an ear 25 provided on the casing and its opposite end to a similar ear formed on the member 19 of the telescopic arm yieldingly, holding and maintaining the telescopic arm in normal position as shown in Fig. 1.

Guiding sheave pulleys 26 and 27 are rotatably mounted on the bracket 17 as shown in Fig. 1. A cable or the like 28 is attached at one end to an ear 29 provided on the member 19 of the telescopic arm and is adapted to travel underneath the guide pulley 26 and over the top of the guide pulley 27. The end of the cable extending over the sheave pulley 27 is attached taut and adjacent to the free end of a crank 30 which is mounted upon and rigidly secured to a rotatable shaft 31 which shaft is journaled in bifurcated brackets 32 provided on the lamps. A lever arm 33 is mounted upon and rigidly secured to the rotatable shaft 31 by a pin 34. One end of a link 35 is pivotally attached to the free end of the lever arm 33 by the pin 36. The free end of the link 35 extends rearwardly to a point convenient for the driver of the car to operate.

It will of course be understood that the invention is applied to a pair of lamps which are attached to the front end of the motor car or the like. Both lamps and the invention which is applied thereto are the same or substantially identical in construction and operation. Attention however, is called to the fact that the rotatable shaft 31, lever arm 33 and link 35 operate the mechanism comprising the invention in both lamps simultaneously.

The operation of the invention for the purpose intended in brief is as follows: When the driver of a car equipped with this invention approaches an oncoming car, the driver exerts a pull upon the link bar 35 forcing the crank 30 to assume the dotted line position shown in Fig. 1, and the telescopic arm is forced to pivot through the medium of the connecting cable 28 sliding and projecting the shade 12 through the slot 7 to the dotted line position X—X as shown in Fig. 1, thereby intercepting the rays of light from the light source and the shooting rays of light reflected from the lower portion of the reflector and the sides thereof, up to the point where the sides of the shade extend on each side of the light source or globe 4. When the shade is in said forward or projected position it shades a pre-determined portion of the light source as described and interrupts and intercepts the reflected rays of light from the reflector. The rays reflected by the upper portion of the reflector are no way affected when the shade is in its forward position and the rays of light from the light source and rays reflected from the upper portion of the reflector continually shoot downward in full illumination on the road bed in an angular relation to the plane of the car. When the oncoming car has passed the approaching car the link 35 is released and the spring 24 automatically exerts its tension to return the telescopic arm and shade to their normal positions as shown in Fig. 1.

Attention is called to the fact that advantage is taken in the use of the invention as herein described of the full and complete illumination, reflection and glare of the upper portion of the reflector on the road when the driver of an approaching car is passing an oncoming car, while at the same time the rays of light reflected from the lower portion of the reflector are intercepted and prevented from blinding the vision of the driver of the oncoming car.

Claims:

1. In a light ray projector, a casing, a reflector provided with an opening, a bracket, a light interceptor slidably mounted on said bracket, said bracket and sliding member being provided with alined slots, a second bracket, attached to the reflector in spaced relation to the first mentioned bracket, pivoted means mounted on the last mentioned bracket to move the sliding member to intercept the light ray beneath the horizontal axial line of the bulb, at the will of the operator.

2. In a light ray projector, a reflector, a light source secured thereto, a movable light ray interceptor associated with the light source, means secured to the reflector to slidably support the light ray interceptor, a bracket, a telescopic member pivoted to the bracket and connected to the slidable light ray interceptor to actuate same.

3. In a light ray projector, a reflector, a light source secured thereto, a movable light ray interceptor, means secured to the reflector to slidably support the light ray interceptor, a bracket, a telescopic member pivoted to the bracket, and connected to the slidable light ray interceptor and means to impart a pivotal movement to the telescopic member.

4. The combination with a reflector lamp of a light source secured thereto, the reflector also being provided with a slot, means for slidably mounting a member which is adapted to be projected through said slot for intercepting the light rays from the light source and reflector and pivoted telescopic means connected to said slidable member for imparting movement to the slidable member as and for the purpose described.

In testimony whereof I affix my signature.

ARTHUR CHARLES WOOD.